(12) United States Patent
Matsuo et al.

(10) Patent No.: US 8,531,409 B2
(45) Date of Patent: Sep. 10, 2013

(54) ELECTRICAL CAPACITANCE INPUT DEVICE, DISPLAY APPARATUS WITH INPUT FUNCTION AND ELECTRONIC APPARATUS

(75) Inventors: Mutsumi Matsuo, Azumino (JP); Yasuhiro Kobayashi, Azumino (JP)

(73) Assignee: Japan Display West Inc., Chita-Gun, Aichi-Ken (JP)

( * ) Notice: Subject to any disclaimer, the term of this patent is extended or adjusted under 35 U.S.C. 154(b) by 733 days.

(21) Appl. No.: 12/391,322

(22) Filed: Feb. 24, 2009

(65) Prior Publication Data
US 2009/0244021 A1 Oct. 1, 2009

(30) Foreign Application Priority Data
Mar. 26, 2008 (JP) ................................ 2008-079906

(51) Int. Cl.
*G06F 3/041* (2006.01)
(52) U.S. Cl.
USPC ....................................... 345/173; 178/18.06
(58) Field of Classification Search
USPC .................... 345/173, 174; 178/18.03, 18.06, 178/18.08
See application file for complete search history.

(56) References Cited

U.S. PATENT DOCUMENTS

| 5,473,195 A | 12/1995 | Koike | |
|---|---|---|---|
| 6,570,812 B2 | 5/2003 | Kono | |
| 2007/0268272 A1* | 11/2007 | Perski et al. | 345/173 |
| 2008/0047764 A1* | 2/2008 | Lee et al. | 178/18.06 |
| 2009/0040192 A1* | 2/2009 | Haga | 345/174 |

FOREIGN PATENT DOCUMENTS

| JP | 06-302694 | 10/1994 |
|---|---|---|
| JP | 2002-237188 | 8/2002 |
| JP | 2005-337773 | 12/2005 |
| JP | 2007-018226 | 1/2007 |
| JP | 2007-184125 | 7/2007 |
| WO | WO2007-08518 | 1/2007 |

* cited by examiner

*Primary Examiner* — Adam R Giesy
(74) *Attorney, Agent, or Firm* — K&L Gates LLP

(57) ABSTRACT

An electrostatic capacitance input device having a plurality of first electrodes extending in a first direction and a plurality of second electrodes extending in a second direction intersecting the first direction in an input area, including a plurality of first lines extending in parallel to each other from the plurality of first electrodes to a plurality of first terminals, and a plurality of second lines extending in parallel to each other from the plurality of second electrode to a plurality of second terminals, the first lines and the second lines being formed outside the input area, and an auxiliary line extending outside at least one of the lines at both ends in terms of the direction of arrangement of one or both of the plurality of first lines and the plurality of second lines, the auxiliary line generating a parasitic capacitance with respect to the at least one of the lines.

9 Claims, 9 Drawing Sheets

DIRECTION Y

DIRECTION X

FIG. 4

| COLUMN 1 | COLUMN 2 | COLUMN 3 | | COLUM 4 | COLUMN 5 | COLUMN 6 | COLUMN 7 |
|---|---|---|---|---|---|---|---|
| LINE | PORTION | LENGTH μm | | WIDTH μm | DISTANCE μm | PARASITIC CAPACITANCE PF | DISTRIBUTION Ω |
| 971 | 955 | a | 2042.0 | 300 | 200 | | 304 |
| | | b | 15660.0 | 65 | 55 | | |
| | | c | 77017.5 | 65 | 55 | | |
| | | d | 770.0 | 7037 | 543 | (0.96) | |
| 911 | 955 | a | 2137.5 | 300 | 200 | 4.88 | 375 |
| | | b | 16072.5 | 65 | 55 | | |
| | | c | 69342.5 | 65 | 55 | | |
| | | d | 682.5 | 7037 | 543 | (0.92) | |
| 912 | 955 | a | 2232.0 | 300 | 200 | 4.87 | 389 |
| | | b | 16940.0 | 60 | 45 | | |
| | | c | 61668.0 | 60 | 45 | | |
| | | d | 600.0 | 7037 | 543 | (0.95) | |
| 913 | 955 | a | 2325.5 | 300 | 200 | 4.96 | 399 |
| | | b | 16912.5 | 55 | 35 | | |
| | | c | 53994.5 | 55 | 35 | | |
| | | d | 522.5 | 7037 | 543 | (1.01) | |
| 914 | 955 | a | 2418.0 | 300 | 200 | 4.96 | 418 |
| | | b | 17340.0 | 50 | 30 | | |
| | | c | 46322.0 | 50 | 30 | | |
| | | d | 450.0 | 7037 | 543 | (0.95) | |
| 915 | 955 | a | 2509.0 | 300 | 200 | 4.86 | 443 |
| | | b | 17772.5 | 45 | 25 | | |
| | | c | 38651.0 | 45 | 25 | | |
| | | d | 382.5 | 7037 | 543 | (0.90) | |
| 916 | 955 | a | 2597.5 | 300 | 200 | 4.83 | 482 |
| | | b | 18210.0 | 40 | 20 | | |
| | | c | 30982.5 | 40 | 20 | | |
| | | d | 320.0 | 7037 | 543 | (0.93) | |
| 917 | 955 | a | 2682.0 | 300 | 200 | 4.91 | 410 |
| | | b | 18652.5 | 40 | 15 | | |
| | | c | 23317.5 | 40 | 15 | | |
| | | d | 262.5 | 7037 | 543 | (0.98) | |
| 918 | 955 | a | 2762.5 | 300 | 200 | 5.04 | 450 |
| | | b | 19100.0 | 35 | 10 | | |
| | | c | 15657.5 | 35 | 10 | | |
| | | d | 210.0 | 7037 | 543 | (1.05) | |
| 919 | 955 | a | 2835.0 | 300 | 200 | 4.82 | 531 |
| | | b | 19552.5 | 30 | 15 | | |
| | | c | 8005.0 | 30 | 15 | | |
| | | d | 162.5 | 7037 | 543 | (0.77) | |
| 972 | 955 | a | 2892.5 | 300 | 200 | | 531 |
| | | b | 20010.0 | 30 | 15 | | |
| | | c | 364.0 | 30 | 15 | | |
| | | d | 205.0 | 7037 | 543 | | |

FIG. 5

| COLUMN 1 | COLUMN 2 | COLUMN 3 | | COLUMN 4 | COLUMN 5 | COLUMN 6 | COLUMN 7 |
|---|---|---|---|---|---|---|---|
| LINE | PORTION | LENGTH μm | | WIDTH μm | DISTANCE μm | PARASITIC CAPACITANCE PF | DISTRIBUTION Ω |
| 911 | 955 | a | 2137.5 | 300 | 200 | 8.33 | 307 |
| | | b | 16072.5 | 75 | 20 | | |
| | | c | 68342.5 | 75 | 10 | | |
| | | d | 682.5 | 7037 | 543 | (5.33) | |
| 912 | 955 | a | 2232.0 | 300 | 200 | 12.87 | 306 |
| | | b | 16940.0 | 74 | 20 | | |
| | | c | 60768.0 | 70 | 10 | | |
| | | d | 600.0 | 7037 | 543 | (4.54) | |
| 913 | 955 | a | 2325.5 | 300 | 200 | 11.31 | 299 |
| | | b | 16912.5 | 73 | 20 | | |
| | | c | 52994.5 | 65 | 10 | | |
| | | d | 522.5 | 7037 | 543 | (3.77) | |
| 914 | 955 | a | 2418.0 | 300 | 200 | 9.86 | 293 |
| | | b | 17340.0 | 72 | 20 | | |
| | | c | 45322.0 | 60 | 10 | | |
| | | d | 450.0 | 7037 | 543 | (3.09) | |
| 915 | 955 | a | 2509.0 | 300 | 200 | 8.58 | 286 |
| | | b | 17772.5 | 70 | 20 | | |
| | | c | 37651.0 | 55 | 10 | | |
| | | d | 382.5 | 7037 | 543 | (2.48) | |
| 916 | 955 | a | 2597.5 | 300 | 200 | 7.42 | 277 |
| | | b | 18210.0 | 67 | 20 | | |
| | | c | 29982.5 | 50 | 10 | | |
| | | d | 320.0 | 7037 | 543 | (1.94) | |
| 917 | 955 | a | 2682.0 | 300 | 200 | 6.38 | 265 |
| | | b | 18652.5 | 63 | 20 | | |
| | | c | 22317.5 | 45 | 10 | | |
| | | d | 262.5 | 7037 | 543 | (1.45) | |
| 918 | 955 | a | 2762.5 | 300 | 200 | 5.46 | 250 |
| | | b | 19100.0 | 57 | 20 | | |
| | | c | 14657.5 | 40 | 10 | | |
| | | d | 210.0 | 7037 | 543 | (1.01) | |
| 919 | 955 | a | 2835.0 | 300 | 200 | 4.01 | 233 |
| | | b | 19552.5 | 48 | 20 | | |
| | | c | 7005.0 | 35 | 10 | | |
| | | d | 162.5 | 7037 | 543 | | |

FIG. 6

| COLUMN 1 | COLUMN 2 | | COLUMN 3 | COLUMN 4 | COLUMN 5 | COLUMN 6 | COLUMN 7 |
|---|---|---|---|---|---|---|---|
| LINE | PORTION | | LENGTH μm | WIDTH μm | DISTANCE μm | PARASITIC CAPACITANCE PF | DISTRIBUTION Ω |
| 921 | 962 | a | 2660.0 | 300 | 200 | 4.68 | 418 |
| | | b | 18550.0 | 65 | 35 | *1.61 | |
| | | c | 71940.0 | 65 | 35 | | |
| | | d | 3600.0 | 65 | 35 | | |
| | | e | 330.0 | 6445 | 435 | | |
| | | | | | | (1.68) | |
| 922 | 962 | a | 2579.0 | 300 | 200 | 6.31 | 448 |
| | | b | 18131.0 | 65 | 40 | | |
| | | c | 72102.0 | 65 | 40 | | |
| | | d | 10561.0 | 65 | 40 | | |
| | | e | 411.0 | 6445 | 435 | | |
| | | | | | | (1.63) | |
| 923 | 962 | a | 2496.0 | 300 | 200 | 6.24 | 430 |
| | | b | 17714.0 | 70 | 45 | | |
| | | c | 72268.0 | 70 | 45 | | |
| | | d | 17524.0 | 70 | 45 | | |
| | | e | 494.0 | 6445 | 435 | | |
| | | | | | | (1.61) | |
| 924 | 962 | a | 2411.0 | 300 | 200 | 6.14 | 457 |
| | | b | 17299.0 | 70 | 50 | | |
| | | c | 72438.0 | 70 | 50 | | |
| | | d | 24489.0 | 70 | 50 | | |
| | | e | 579.0 | 6445 | 435 | | |
| | | | | | | (1.54) | |
| 925 | 962 | a | 2324.0 | 300 | 200 | 6.16 | 484 |
| | | b | 16886.0 | 70 | 50 | | |
| | | c | 72612.0 | 70 | 50 | | |
| | | d | 31456.0 | 70 | 50 | | |
| | | e | 666.0 | 6445 | 435 | | |
| | | | | | | (1.63) | |
| 926 | 962 | a | 2235.0 | 300 | 200 | 6.22 | 511 |
| | | b | 16475.0 | 70 | 50 | | |
| | | c | 72790.0 | 70 | 50 | | |
| | | d | 38425.0 | 70 | 50 | | |
| | | e | 755.0 | 6445 | 435 | | |
| | | | | | | (1.59) | |
| 971 | 962 | a | 2143.0 | 300 | 200 | | 638 |
| | | b | 16066.0 | 60 | 40 | | |
| | | c | 72972.0 | 60 | 40 | | |
| | | d | 45396.0 | 60 | 40 | | |
| | | e | 847.0 | 6445 | 435 | | |

FIG. 7

| COLUMN 1 | COLUMN 2 | | COLUMN 3 | COLUMN 4 | COLUMN 5 | COLUMN 6 | COLUMN 7 |
|---|---|---|---|---|---|---|---|
| LINE | PORTION | | LENGTH μm | WIDTH μm | DISTANCE μm | PARASITIC CAPACITANCE PF | DISTRIBUTION Ω |
| 921 | 962 | a | 2660.0 | 300 | 200 | 9.41 | 376 |
| | | b | 18550.0 | 70 | 10 | | |
| | | c | 71940.0 | 70 | 10 | | |
| | | d | 3600.0 | 70 | 10 | | |
| | | e | 330.0 | 6445 | 435 | | |
| | | | | | | (6.41) | |
| 922 | 962 | a | 2579.0 | 300 | 200 | 16.46 | 388 |
| | | b | 18131.0 | 72 | 10 | | |
| | | c | 72102.0 | 72 | 10 | | |
| | | d | 10561.0 | 72 | 10 | | |
| | | e | 411.0 | 6445 | 435 | | |
| | | | | | | (7.05) | |
| 923 | 962 | a | 2496.0 | 300 | 200 | 17.75 | 403 |
| | | b | 17714.0 | 74 | 10 | | |
| | | c | 72268.0 | 74 | 10 | | |
| | | d | 17524.0 | 70 | 10 | | |
| | | e | 494.0 | 6445 | 435 | | |
| | | | | | | (7.71) | |
| 924 | 962 | a | 2411.0 | 300 | 200 | 19.15 | 408 |
| | | b | 17299.0 | 76 | 10 | | |
| | | c | 72438.0 | 76 | 10 | | |
| | | d | 24489.0 | 76 | 10 | | |
| | | e | 579.0 | 6445 | 435 | | |
| | | | | | | (8.45) | |
| 925 | 962 | a | 2324.0 | 300 | 200 | 20.62 | 417 |
| | | b | 16886.0 | 78 | 10 | | |
| | | c | 72612.0 | 78 | 10 | | |
| | | d | 31456.0 | 78 | 10 | | |
| | | e | 666.0 | 6445 | 435 | | |
| | | | | | | (9.18) | |
| 926 | 962 | a | 2235.0 | 300 | 200 | 12.18 | 426 |
| | | b | 16475.0 | 80 | 10 | | |
| | | c | 72790.0 | 80 | 10 | | |
| | | d | 38425.0 | 80 | 10 | | |
| | | e | 755.0 | 6445 | 435 | | |

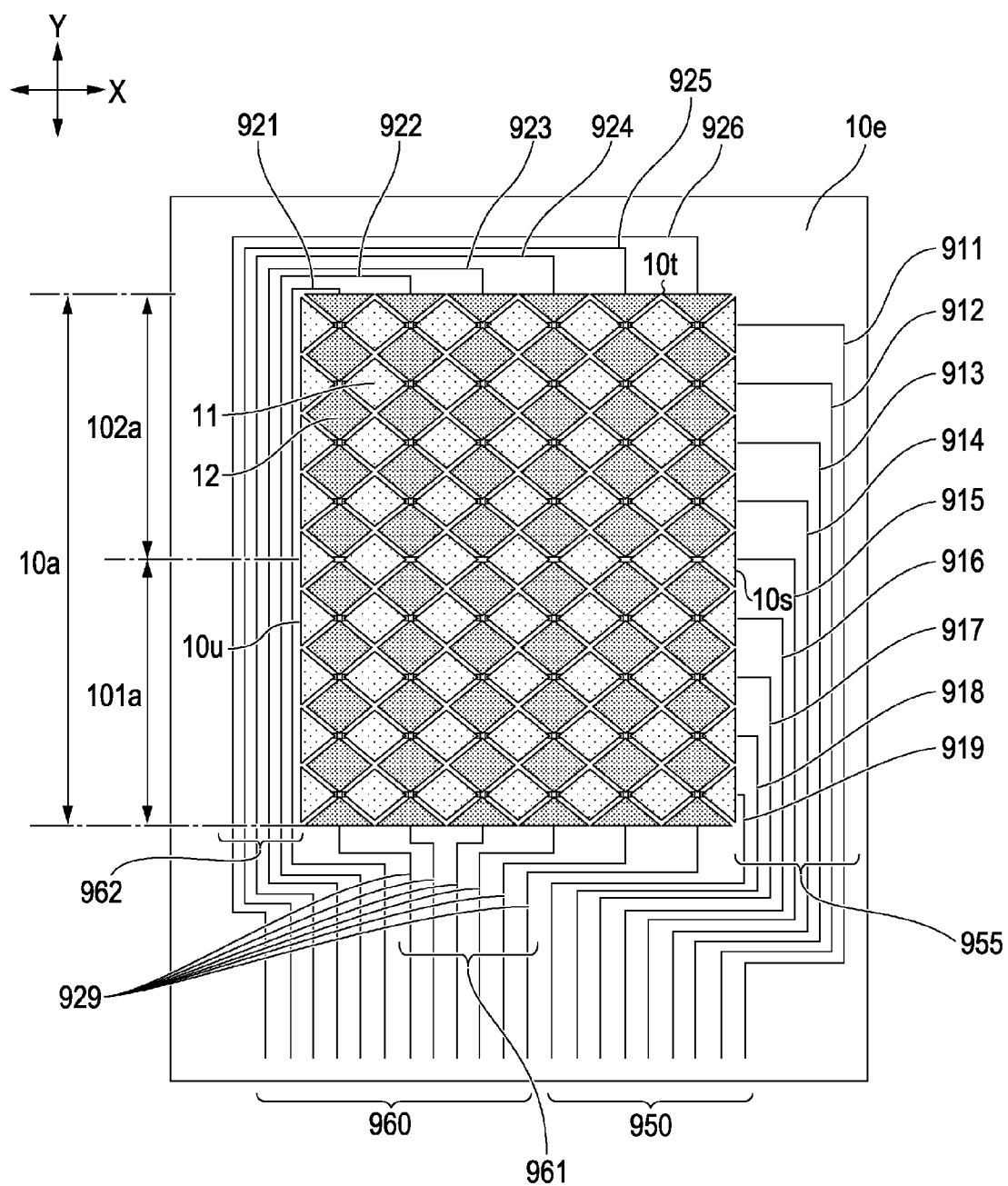

ELECTRICAL CAPACITANCE INPUT DEVICE, DISPLAY APPARATUS WITH INPUT FUNCTION AND ELECTRONIC APPARATUS

The entire disclosure of Japanese Patent Application No. 2008-079906, filed Mar. 26, 2008 is expressly incorporated by reference herein.

BACKGROUND

1. Technical Field

The present invention relates to an electrostatic capacitance input device which is able to detect a position where a finger comes into contact with as a change in electrostatic capacitance, a display apparatus with an input function, and an electronic apparatus.

2. Related Art

In recent years, some of electronic apparatuses such as mobile phone sets, car navigation systems, personal computers, ticket-vending machines, and bank terminals include an input device of a tablet type arranged on a surface of a liquid crystal device or the like thereof, whereby input of data corresponding to instruction images displayed in an image display area of the liquid crystal device is achieved by referring to the instruction images and touching areas where the instruction images are displayed with a finger or the like.

Such the input devices (touch panels) include a resistance film type and an electrostatic capacitance type, and the input device of the resistance film type has a double structure including film and glass and is configured to press the film to short-circuit, so that disadvantages such as the narrowness of the range of the operating temperature or weakness for the change with time are resulted.

In contrast, the electrostatic capacitance input device has an advantage such that a translucent conductive film may simply be formed on a single substrate. In the electrostatic capacitance input device, for example, electrode patterns are extended in the directions intersecting with respect to teach other and an input position is detected by sensing the change of the electrostatic capacitance between electrodes when the finger or the like comes into contact therewith or in proximity thereto (for example, JP-A-2005-337773).

In the electrostatic capacitance input device as described above, for example, as shown in FIG. 9, a plurality of first translucent electrode patterns 11 extending in a direction X and a plurality of second translucent electrode patterns 12 extending in a direction Y, where the direction X and the direction Y are directions intersecting with respect to each other in the direction of the plane of a substrate, are formed in an input area 10a of the substrate, and a first distribution area 955 having a plurality of first lines 911 to 919 extending from the plurality of first translucent electrode patterns 11 to a first signal input/output area 950 so as to be arranged in parallel to each other and a second distribution area (a short distance second distribution area 961 and a long distance second distribution area 962) having a plurality of second lines 921 to 926 and 929 extending from the plurality of second translucent electrode patterns 12 to a second signal input/output area 960 so as to arranged in parallel to each other are formed in a peripheral area 10e outside the input area 10a on the substrate. The configuration shown in FIG. 9 is thought out by the present inventor for comparing with the invention of this application, and hence is not a related art.

Since the change in the electrostatic capacitance in the electrostatic capacitance input device, if the capacitances which are parasitic on the lines are varied from line-to-line, such variations cannot be absorbed by the correction in a detection circuit and hence the sensitivity of detection is disadvantageously and significantly lowered. In the configuration shown in FIG. 9, the capacitances which are parasitic on the lines vary from line-to-line from the reason described below.

As shown in FIG. 9, when the first signal input/output area 950 is arranged on one side of the input area 10a in terms of the direction Y, the first distribution area 955 extends from an end side 10s on one side of the input area 10a in terms of the direction X to the first signal input/output area 950 along the end side 10s. When the input area 10a is divided into a first input area 101a located on the side of the second signal input/output area 960 in terms of the direction Y and a second input area 102a located on the side opposite from the side of the second signal input/output area 960 in terms of the direction Y so as to enable detection of multipoint instruction although the second signal input/output area 960 is arranged on one side of the input area 10a in terms of the direction Y, the plurality of second lines 921 to 926 to be connected to the second translucent electrode patterns 12 in the second input area 102a extend from an end side 10t located on the opposite side of the input area 10a from the second signal input/output area 960 to the second signal input/output area 960 along one end side 10u of the input area 10a in terms of the direction X.

In such a case, since the lengths of the lines are significantly different among the plurality of first lines 911 to 919, the capacitances which are parasitic between the adjacent lines disadvantageously and significantly different among the first lines 911 to 919 from line-to-line. Also, since the lengths of the lines are significantly different among the plurality of second lines 921 to 926 extending from the second input area 102a, the capacitances which are parasitic between the adjacent lines disadvantageously and significantly different among the second lines 921 to 926 from line-to-line.

SUMMARY

An advantage of some aspects of the invention is to provide an electrostatic capacitance input device, a display apparatus with an input function, and an electronic apparatus in which improvement of detection sensitivity is achieved by compressing line-to-line variations of capacitance which is parasitic on lines when detecting an instructed position by the change in electrostatic capacitance.

According to a first aspect of the invention, there is provided an electrostatic capacitance input device including a plurality of first electrodes extending in a first direction and a plurality of second electrodes extending in a second direction intersecting the first direction in an input area, including a plurality of first lines extending in parallel to each other from the plurality of first electrodes to a plurality of first terminals, and a plurality of second lines extending in parallel to each other from the plurality of second electrode to a plurality of second terminals, the first lines and the second lines being formed outside the input area, and an auxiliary line extending outside at least one of the lines at both ends in terms of the direction of arrangement of one or both of the plurality of first lines and the plurality of second lines, the auxiliary line generating a parasitic capacitance with respect to the at least one of the lines.

In the invention, in the distribution area in which the plurality of lines are arranged in parallel, a capacitance is generated between the adjacent lines. However, the parasitic capacitance is small in the line extending at the end of the distribution area because the adjacent line is present only on one side thereof. Therefore, according to the embodiment of the invention, the auxiliary line that generates the parasitic capacitance with respect to the line extending at the end is provided so as to extend along the end of the distribution area in terms of the direction of arrangement of the lines. Therefore, the similar capacitance as other lines is parasitic on the end line as well. Therefore, the capacitances which are parasitic on the plurality of lines are all equivalent, the change in capacitance can be detected accurately, so that the sensitivity of detection is improved.

Preferably, one or both of the plurality of first lines and the plurality of second lines include one line and lines being arranged on both sides of the one line and being different in terms of the length of a portion which extends in parallel to the one line, and the distance from the one line is wider on the side of the line being longer in terms of the length of the portion which extends in parallel to the one line than on the side of the line being shorter in terms of the length of the portion which extends in parallel to the one line. The long lines have a larger parasitic capacitance by an amount corresponding to the long opposing length with respect to the adjacent line. However, since the distance between the adjacent lines is increased, the parasitic capacitance may be reduced. Therefore, since the capacitances which are parasitic on the plurality of lines may all be equalized, the change in capacitance can be detected accurately, so that the sensitivity of detection is improved.

Preferably, one or both of the plurality of first lines and the plurality of second line include lines being different in terms of the length, and the width of the lines having a long distribution length is at least partly wider than the lines having a short distribution length. When the line is long, the electric resistance is increased correspondingly. However, since the width of at least part of the lines is increased, the electric resistances of the plurality of lines are the same. Therefore, the change in capacitance can be detected accurately, so that the sensitivity of detection is improved.

Preferably, the auxiliary line includes a first auxiliary line and a second auxiliary line arranged outsides the lines at the both ends of one or both of the plurality of first lines and the plurality of second lines in terms of the direction of arrangement thereof, and the first auxiliary line and the second auxiliary line generate the parasitic capacitances with respect to the lines at both ends respectively. In this arrangement, since the parasitic capacitances may be added to the lines located at the both ends of the distribution area by the first auxiliary line and the second auxiliary line, the capacitances which are parasitic on the respective plurality of lines may be equalized. Therefore, the change in capacitance can be detected accurately, so that the sensitivity of detection is improved.

Preferably, the plurality of first line extend from one of the ends of the plurality of first electrodes in the input area to the plurality of first terminals so as to extend along an end side of the input area, the auxiliary line includes a first auxiliary line and a second auxiliary line arranged outsides the lines at the both ends of the plurality of first lines in terms of the direction of arrangement thereof, and the first auxiliary line and the second auxiliary line generate the parasitic capacitances with respect to the lines at the both ends respectively.

Preferably, the first auxiliary line constitutes a shield line which surrounds the input area on the outer peripheral side. In this configuration, the influence of noise entering from the outside is prevented. Therefore the change in capacitance is detected accurately, so that the sensitivity of detection is improved.

Preferably, the plurality of second lines extends from the both ends of the plurality of second electrodes in the display area to the plurality of second terminals, the plurality of second lines extending from the one of the both ends of the plurality of second electrodes has a different length from the plurality of second lines extending from the other ends, the auxiliary line extends at least outside the line located on the opposite side from the input area from between the lines arranged at both ends of the plurality of longer second lines in terms of the direction of arrangement of the lines. The second line located at the end on the side of the input area from between the both ends of the second distribution area extending from the second input area to the second signal input/output area extends in parallel to second translucent electrode patterns, and the parasitic capacitance is generated with respect to the second translucent electrode patterns, so that the auxiliary line is provided only at the end opposite from the side of the input area.

According to a second aspect of the invention, there is provided an electrostatic capacitance input device including a plurality of first electrodes extending in a first direction and a plurality of second electrodes extending in a second direction intersecting the first direction including a plurality of first lines extending in parallel to each other from the plurality of first electrodes to a plurality of first terminals, and a plurality of second lines extending in parallel to each other from the plurality of second electrode to a plurality of second terminals, the first lines and the second lines being formed outside the input area, and one or both of the plurality of first lines and the plurality of second lines include one line and lines being arranged on both sides of the one line and being different in terms of the length of a portion which extends in parallel to the one line, and the distance from the one line is wider on the side of the line being longer in terms of the length of the portion which extends in parallel to the one line than on the side of the line being shorter in terms of the length of the portion which extends in parallel to the one line. The long lines have a larger parasitic capacitance by an amount corresponding to the long opposing length with respect to the adjacent line. However, since the distance between the adjacent lines is increased, the parasitic capacitance may be reduced. Therefore, the capacitances which are parasitic on the plurality of lines are all equivalent, the change in capacitance can be detected accurately, so that the sensitivity of detection is improved.

When configuring a display apparatus with an input function using the electrostatic capacitance input device to which the invention is applied, an image forming apparatus is overlapped on the opposite side from an input surface in the electrostatic capacitance input device.

The display apparatus with an input function to which the invention is applied may be used in electronic apparatuses such as mobile phone sets, electronic data books, and terminal devices such as POS terminals.

BRIEF DESCRIPTION OF THE DRAWINGS

The invention will be described with reference to the accompanying drawings, wherein like numbers reference like elements.

FIG. 4 is an explanatory drawing showing an example of configuration of first lines formed in the input device to which the invention is applied.

FIG. 5 is an explanatory drawing showing an example of configuration of the first line formed in the input device according to a reference example drawing in the invention.

FIG. 6 is an explanatory drawing showing an example of configuration of second lines formed in the input device to which the invention is applied.

FIG. 7 is an explanatory drawing showing a configuration of the second lines formed in the input device according to a reference example in the invention.

FIG. 9 is an explanatory drawing schematically showing a planer configuration of the display apparatus with an input function according to a reference example in the invention.

DESCRIPTION OF EXEMPLARY EMBODIMENTS

Figure 1:
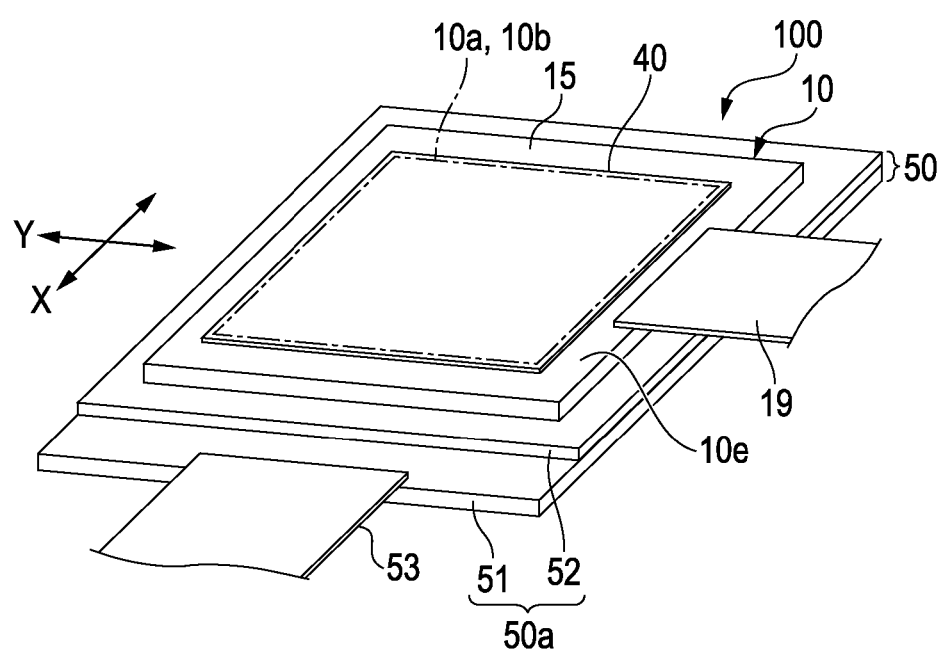
FIG. 1 is an explanatory drawing schematically showing a configuration of a display apparatus with an input function to which the invention is applied.

Referring now to the drawings, embodiments of the invention will be described. In the drawings referred to in the following description, scaling is differentiated among respective layers or members in order to make the respective layers and members recognizable in the drawing.

General Configuration

Figure 2:
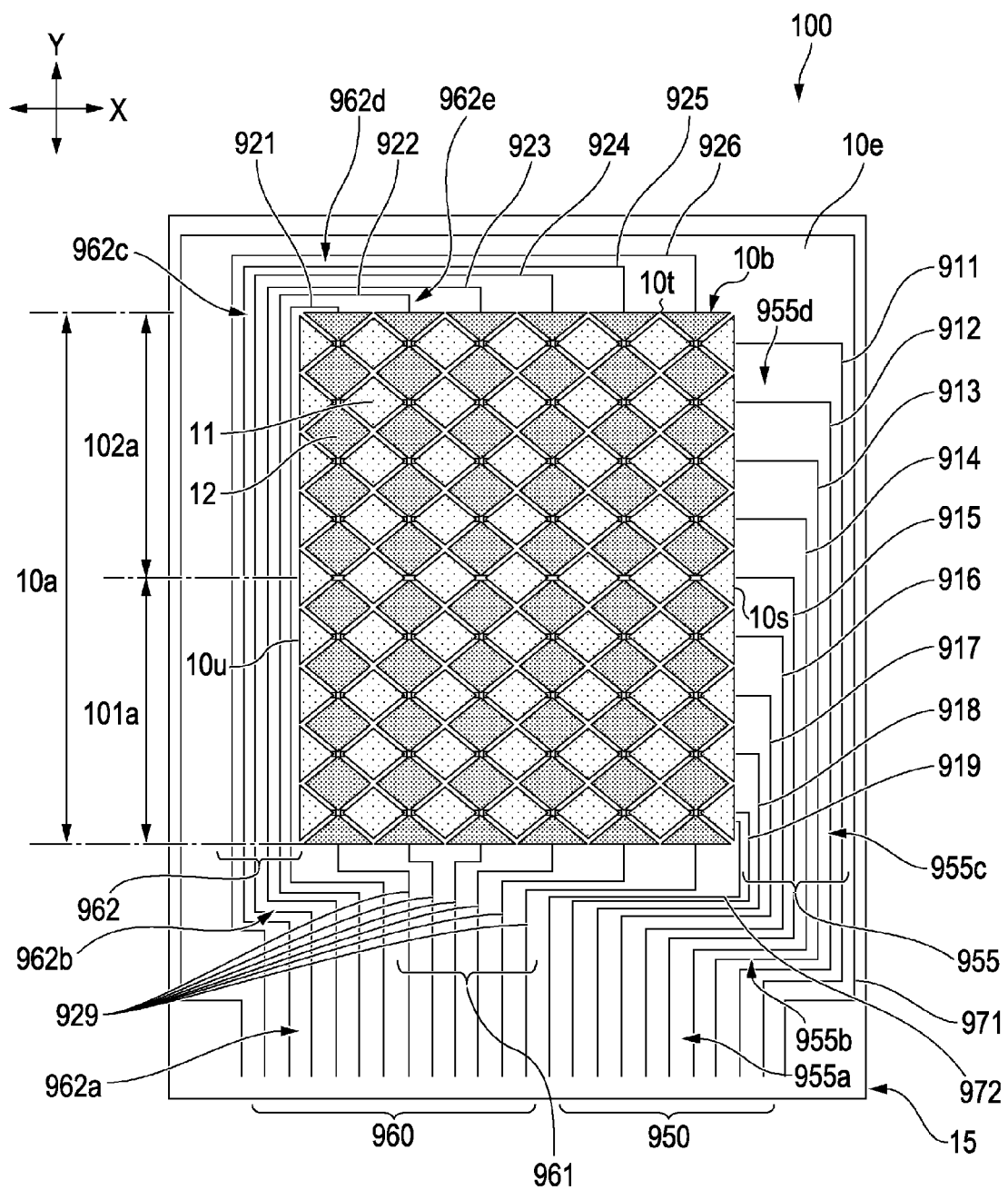
FIG. 2 is an explanatory drawing schematically showing a planer configuration of the display apparatus with an input function to which the invention is applied.

FIG. 1 and FIG. 2 are respectively an explanatory drawing schematically showing a configuration of a display apparatus with an input function to which the invention is applied, and an explanatory drawing schematically showing a planar configuration of the display apparatus with an input function. In FIG. 2, the numbers of first translucent electrode patterns, second translucent electrode patterns, or lines are reduced from the actual numbers.

In FIG. 1, a display apparatus with an input function 100 generally includes a liquid crystal device 50 of an active matrix type as an image forming apparatus, and a panel-shaped input device 10 (touch panel) arranged so as to be overlapped with a surface of the image forming apparatus in the side where a display light is emitted from. The liquid crystal device 50 includes a translucent, reflective, or transflective liquid crystal panel 50a, and in the case of the translucent or the transflective liquid crystal panel, a backlight device (not shown) is arranged on the opposite side from the side where the display light is emitted from. In the liquid crystal device 50, a wave plate and a polarizing plate (not shown) are arranged so as to be overlapped with the liquid crystal panel 50a. The liquid crystal panel 50a includes an element substrate 51, an opposed substrate 52 arranged so as to oppose the element substrate 51, and a liquid crystal layer held between the opposed substrate 52 and the element substrate 51, and a flexible substrate 53 is connected to the element substrate 51 in an area protruded from an edge of the opposed substrate 52. The element substrate 51 may include a drive IC mounted by COG (Chip-on-Glass) mounting. In either cases, the liquid crystal device 50 is able to display moving images and still images, and displays instruction images corresponding to entered data when entering data in the input device 10. Therefore, a user is able to enter data by touching the instruction images displayed on the input device 10 with his/her finger.

The input device 10 is an electrostatic capacitance touch panel and includes a translucent substrate 15, a translucent cover substrate 40 adhered to the translucent substrate 15 via an adhesive agent layer (translucent resin layer), described later, and a flexible substrate 19 connected to an end of the translucent substrate 15. A drive circuit (not shown) for detecting an input position in the input device 10 is connected to the flexible substrate 19, and a connected area between the flexible substrate 19 and the translucent substrate 15 corresponds to a signal input/output area, described later. In the input device 10, an input surface 10b is configured by an upper surface of the cover substrate 40, and a substantially center area of the cover substrate 40 corresponds to an input area 10a used for entry by a finger tip.

As shown in FIG. 2, in an area corresponding to the input area 10a of the surface on the side of the input surface 10b of the translucent substrate 15, a plurality of rows of first translucent electrode patterns 11 extending in a first direction indicated by an arrow X and a plurality of rows of second translucent electrode patterns 12 extending in a second direction intersecting the first direction indicated by an arrow Y.

In the input device 10 having the configuration as described above, when a voltage is applied in sequence to the plurality of first translucent electrode patterns 11 and the second translucent electrode patterns 12 to charge the same, if a finger as a conductive substance touches any point in the input area 10a, a capacitance is provided between the first translucent electrode patterns 11 and the second translucent electrode patterns 12 and the finger. Consequently, the electrostatic capacitance is lowered, so that a point which is touched by the finger is detected.

Configuration of Input Area

Figure 3A:
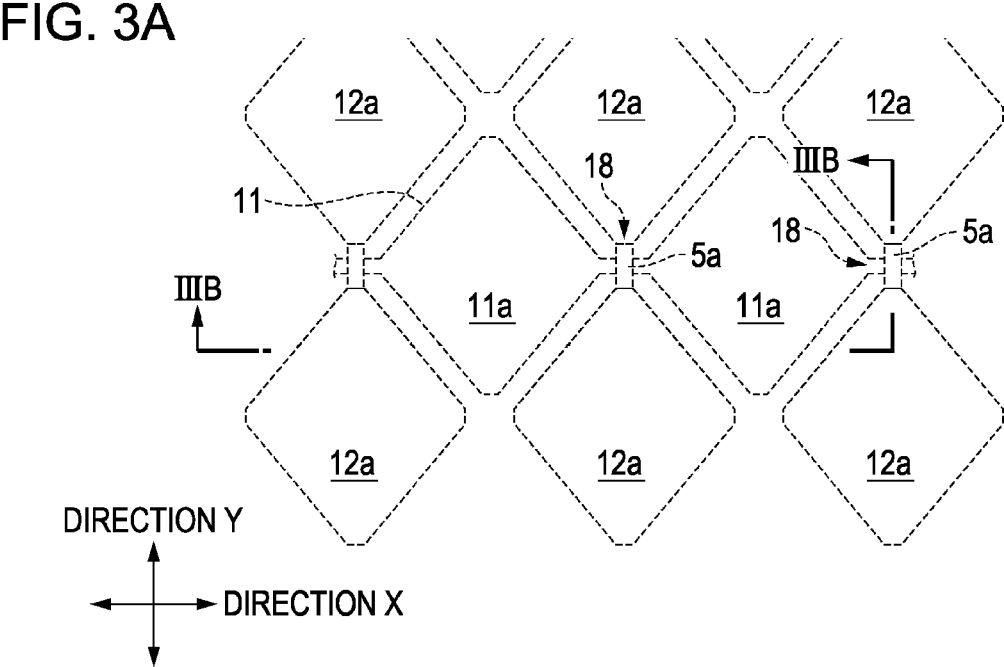
FIG. 3A is an explanatory drawing showing a planer configuration of translucent electrode patterns formed on an input device to which the invention is applied.
Figure 3B:
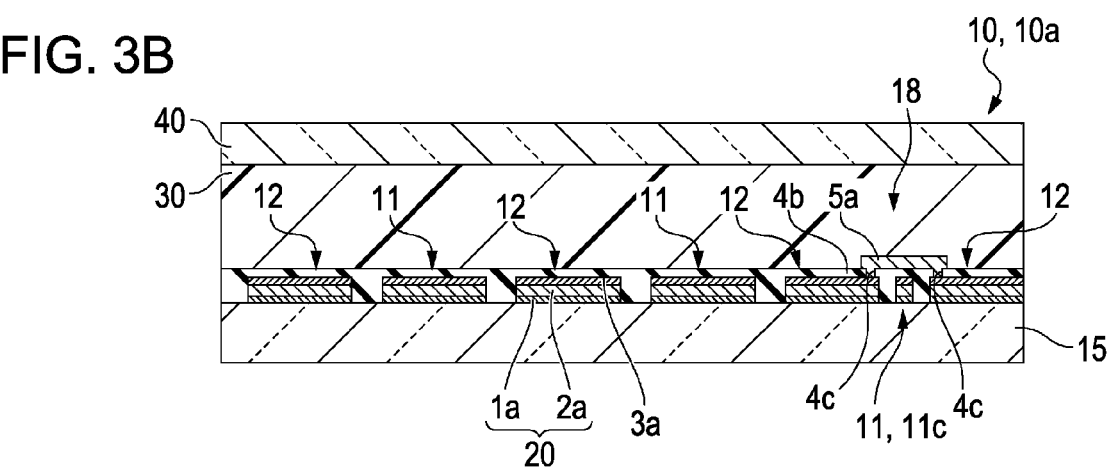
FIG. 3B is a cross-sectional view taken along the line IIIB-IIIB.
Figure 3C:
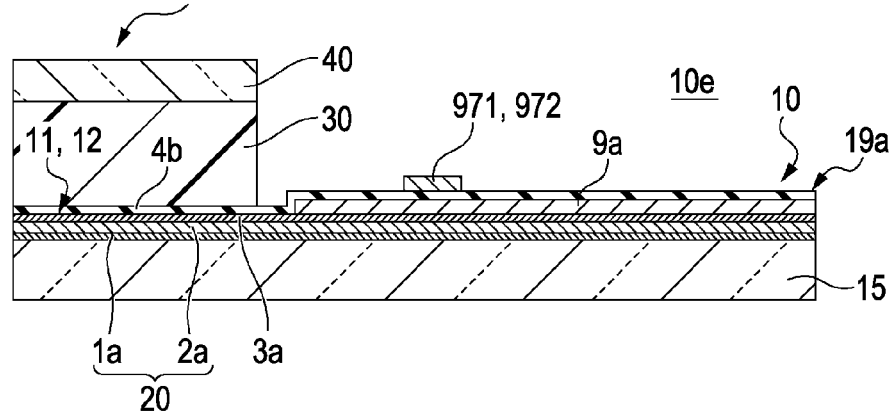
FIG. 3C is a schematic cross-sectional view of the input device showing a connecting structure between the translucent electrode patterns and metal lines.

FIGS. 3A, 3B, and 3C are respectively an explanatory drawing showing a planer configuration of translucent electrode patterns formed on the input device to which the invention is applied, a schematic cross-sectional view of the input device taken along a position corresponding to the line IIIB-IIIB, and a cross-sectional view showing a connecting structure between the translucent electrode patterns and metal lines. In FIG. 3A, part of the first translucent electrode patterns and the second translucent electrode patterns is extracted.

As shown in FIGS. 1, 2, 3A, and 3B, the first translucent electrode patterns 11 and the second translucent electrode patterns 12 are formed on the same surface of the translucent substrate 15 in the same layer in the input device 10 of the embodiment. In the input area 10a, since the first translucent electrode patterns 11 and the second translucent electrode patterns 12 are formed on the same surface of the translucent substrate 15 in the same layer, there exist a plurality of intersecting portions 18 between the first translucent electrode patterns 11 and the second translucent electrode patterns 12. Therefore, in this embodiment, at all the plurality of intersecting portions 18, one of the first translucent electrode patterns 11 and the second translucent electrode patterns 12 are connected at the intersecting portions 18, while the other translucent electrode patterns are disconnected. In this embodiment, at all the plurality of intersecting portions 18, the first translucent electrode patterns 11 are connected and the second translucent electrode patterns 12 are disconnected. On the upper side of the first translucent electrode patterns 11 and the second translucent electrode patterns 12, a translucent inter-layer insulation film 4b is formed substantially entirely of the input area 10a and over a peripheral area 10e located outside the input area 10a, and translucent relay electrodes 5a for electrically connecting the second translucent electrode patterns 12 which are disconnected at the intersecting portions 18 with respect to each other are formed on the upper side of the translucent inter-layer insulation film 4b via contact holes 4c of the inter-layer insulation film 4b. Therefore, the second translucent electrode patterns 12 are electrically connected in the direction Y.

The first translucent electrode patterns 11 and the second translucent electrode patterns 12 includes a rhombus-shaped large-area pad portions 11a and 12a (large-area portion) in areas interposed between the intersecting portions 18 respectively, and the connecting portions 11c located at the intersecting portions 18 have an elongated shape narrower than the pad portions 11a in the first translucent electrode patterns 11. The relay electrodes 5a are also formed into an elongated rectangular shape which is narrower than the pad portions 11a and 12a.

In the translucent substrate 15 configured as described above, the translucent cover substrate 40 is adhered thereto on a surface where the first translucent electrode patterns 11 and the second translucent electrode patterns 12 are formed in the input area 10a by an adhesive agent layer 30.

Also, in the translucent substrate 15, a plurality of metal lines 9a for electrically connecting the first translucent electrode patterns 11 and the second translucent electrode patterns 12 respectively are formed on the outer area (peripheral area 10e) of the input area 10a, and ends of the metal lines 9a constitute terminals 19a for connecting the flexible substrate 19. The metal lines 9a constitute first lines 911 to 919 and second lines 921 to 926 and 929 which will be described referring to FIG. 2.

In the input device 10 configured as described above, in this embodiment, the presence of the first translucent electrode patterns 11 and the second translucent electrode patterns 12 is visible due to the difference in reflecting power between an area where the first translucent electrode patterns 11 and the second translucent electrode patterns 12 are formed and an area where the first translucent electrode patterns 11 and the second translucent electrode patterns 12 are not formed, so that the appearance is deteriorated. Accordingly, in this embodiment, materials and the thicknesses of the first translucent electrode patterns 11 and the second translucent electrode patterns 12 are set on the basis of a reflection preventing technology utilizing an optical interference for the purpose of preventing the lowering of the appearance. The reflection preventing technology utilizing the optical interference is a technology to alleviate the reflected light by inverting the phases of the reflected lights reflected from the surface of a thin film and from a boundary between the substrate and the thin film for cancelling the reflected lights with respect to each other. In other words, the refractive index (n0) of an air layer, the refractive index ($n_1$) and a film thickness ($d_1$) of the thin film, and the refractive index ($n_2$) of the substrate satisfy the following expression;

$$(n_1)^2 = n0 \times n_2$$

$$n_1 \times d_1 = \lambda/4,$$

the refractive index at a wavelength λ (nm) becomes 0%. By utilizing the reflection preventing technology, the difference in reflecting power between the area where the first translucent electrode patterns 11 and the second translucent electrode patterns 12 are formed and the area where the first translucent electrode patterns 11 and the second translucent electrode patterns 12 are not formed is resolved, so that the presence of the first translucent electrode patterns 11 and the second translucent electrode patterns 12 is made invisible. Therefore, in this embodiment, the first translucent electrode patterns 11 and the second translucent electrode patterns 12 are formed of ITO films 3a, and multilayer films 20 for realizing the reflection preventing structure are formed between the first translucent electrode patterns 11 and the translucent substrate 15 and between the second translucent electrode patterns 12 and the translucent substrate 15. As the multilayer film 20, for example, a laminated film composed of an ITO film 1a and a silicon oxide film 2a may be used. The first translucent electrode patterns 11 and the second translucent electrode patterns 12 may be formed of IZO (Indium Zinc Oxide) films.

Laid Around Structure of Lines

Referring again to FIG. 2, in this embodiment, a first distribution area 955 having the plurality of first lines 911 to 919 extending from the plurality of first translucent electrode patterns 11 to a first signal input/output area 950 in parallel to each other is formed in the peripheral area 10e located outside the input area 10a on the translucent substrate 15. The first signal input/output area 950 is arranged on one side of the input area 10a in terms of the direction Y, and the first distribution area 955 extends from one end side 10s of the input area 10a in terms of the direction X along the end side 10s to the first signal input/output area 950 while being bent by a plurality of portions. Therefore, in this embodiment, the first distribution area 955 (the first lines 911 to 919) includes a portion 955d extending linearly in the direction X from the first translucent electrode patterns 11 in the peripheral area 10e, a portion 955c bent at a right angle from the portion 955d along the end side 10s of the input area 10a in the direction Y, a portion 955b bent at a right angle from the portion 955c in the direction X toward an area interposed between the first signal input/output area 950 and the input area 10a, and a portion 955a bent at a right angle from the portion 955b in the direction Y toward the first signal input/output area 950.

In the peripheral area 10e located outside the input area 10a on the translucent substrate 15, the plurality of second lines 921 to 926 and 929 extending from the plurality of second translucent electrode patterns 12 extend to a second signal input/output area 960. The second signal input/output area 960 is also arranged on one side of the input area 10a in terms of the direction Y like the first signal input/output area 950, and the second signal input/output area 960 and the first signal input/output area 950 are arranged linearly along the side of the translucent substrate 15.

The input area 10a is divided into a first input area 101a positioned on the side of the second signal input/output area 960 in terms of the direction Y and a second input area 102a positioned on the opposite side from the second signal input/output area 960 in terms of the direction Y and, in association with this, the second translucent electrode patterns 12 are also divided between the first input area 101a and the second input area 102a. Therefore, the distribution area (second distribution area) extending from the plurality of second translucent electrode patterns 12 is divided into two areas, and in a short distance second distribution area 961 from these two areas having second lines 929 extending from the first input area 101a toward the second signal input/output area 960 aligned in parallel, the second lines 929 extend at a sufficient distance from each other by substantially the same length. Therefore, even when the distribution resistance and the parasitic capacitance are varied among the second lines 929, it does not cause any problem because the level of itself is low.

In contrast, a long distance second distribution area 962 extending from the second input area 102a toward the second signal input/output area 960 extends from an end side 10t positioned on the side of the input area 10a opposite from the second signal input/output area 960 along an end side 10u of the input area 10a on the opposite side from an end side 10s in terms of the direction X to the second signal input/output area 960 while being bent by a plurality of positions. Therefore, in this embodiment, the long distance second distribution area 962 (the second lines 921 to 926) includes a portion 962e extending linearly in the direction Y from the end side 10t of the input area 10a on extensions of the second translucent electrode patterns 12, a portion 962d extending in the direction X from the portion 962e in parallel to the end side 10t, a portion 962c bent at a right angle from the portion 962d in the direction Y along the end side 10u of the input area 10a, a portion 962b bent at a right angle from the portion 962c in the direction X toward an area interposed between the second signal input/output area 960 and the input area 10a, and a portion 962a bent at a right angle from the portion 962b in the direction Y toward the second signal input/output area 960.

Countermeasure for Variations in Parasitic Capacitance and Distribution Resistance As described in conjunction with FIG. 2, since the first distribution area 955 extends from the one end side 10s of the input area 10a in terms of the direction X to the first signal input/output area 950 along the end side 10s, the lengths of the respective first lines 911 to 919 are significantly different from each other and the lines are close to each other in the first distribution area 955. Therefore, in this configuration, the capacitances which are parasitic between the adjacent lines or the distribution resistances of the respective lines are significantly different among the plurality of first lines 911 to 919. In the case of the first lines 911 and 919 which are located at both ends in terms of the direction of arrangement of the lines (the direction of the width of the first distribution area 955) from among the first lines 911 to 919, the parasitic capacitance is small since each of them has the adjacent line only on one side thereof.

The long distance second distribution area 962 extends to the second signal input/output area 960 from the end side 10t of the input area 10a along the end side 10u, the lengths of the respective second lines 921 to 926 are significantly different from each other and the lines are close to each other in the long distance second distribution area 962. Therefore, in this configuration, the capacitances which are parasitic between the adjacent lines and the distribution resistances of the respective lines are significantly different among the plurality of second lines 921 to 926. In the case of the second line 926 which is located at an outer end (an end on the side apart from the input area 10a) in terms of the direction of arrangement of the lines (the direction of the width of the long distance second distribution area 962) from among the second lines 921 to 926, the parasitic capacitance is small since it has the adjacent line only on one side thereof. The second line 921 which is located at an inner end (an end close to the input area 10a) from among the second lines 921 to 926 is in parallel with bottom sides of pad potions divided into a triangle shape of the first translucent electrode patterns 11, and hence has a parasitic capacitance close to the second lines 922 to 925 passing on the inner side in terms of the direction of the width of the long distance second distribution area 962.

In order to solve the line-to-line variations in parasitic capacitance, in this embodiment, a first auxiliary line 971 and a second auxiliary line 972 extend along the both ends of the first distribution area 955 so as to generate the parasitic capacitance with respect to the first lines 911 and 919 extending at the both ends. From between the first auxiliary line 971 and the second auxiliary line 972, the first auxiliary line 971 includes the portion 955d extending linearly in the direction X in the peripheral area 10e, the portion 955c bent at a right angle from the portion 955d along the end side 10s of the input area 10a in the direction Y, the portion 955b bent at a right angle from the portion 955c in the direction X toward the area interposed between the first signal input/output area 950 and the input area 10a, and the portion 955a bent at a right angle from the portion 955b in the direction Y toward a position adjacent to the first signal input/output area 950 like the first distribution area 955 (first lines 911 to 919). The second auxiliary line 972 also includes the portion 955d extending linearly in the direction X in the peripheral area 10e, the portion 955c bent at a right angle from the portion 955d along the end side 10s of the input area 10a in the direction Y, the portion 955b bent at a right angle from the portion 955c in the direction X toward the area interposed between the first signal input/output area 950 and the input area 10a, and the portion 955a bent at a right angle from the portion 955b in the direction Y toward the position adjacent to the first signal input/output area 950 like the first distribution area 955 (first lines 911 to 919).

In this embodiment, in the long distance second distribution area 962 as well, the first auxiliary line 971 extends along the outer end so as to generate a parasitic capacitance with respect to the second line 926 extending at the end like the first distribution area 955. Therefore, the first auxiliary line 971 includes the portion 962e extending linearly in the direction Y, the portion 962d extending in the direction X from the portion 962e in parallel to the end side 10t, the portion 962c bent at a right angle from the portion 962d in the direction Y along the end side 10u of the input area 10a, the portion 962b bent at a right angle from the portion 962c in the direction X toward the area interposed between the second signal input/output area 960 and the input area 10a, and the portion 962a bent at a right angle from the portion 962b in the direction Y toward the side of the second signal input/output area 960 like the long distance second distribution area 962 (the second lines 921 to 926).

The first auxiliary line 971 here extends at a position away from the input area 10a in comparison with the second auxiliary line 972, and constitutes an outer peripheral side shield line which surrounds the input area 10a on the outer peripheral side. The second auxiliary line 972 is retained at the same potential as the first auxiliary line 971 and, in this embodiment, a constant potential (ground potential) is applied on the first auxiliary line 971 and the second auxiliary line 972.

When forming the first auxiliary line 971 and the second auxiliary line 972, specifically, the first auxiliary line 971 and the second auxiliary line 972 are formed simultaneously with the first lines 911 to 919 and the second lines 921 to 926 and 929, and the first auxiliary line 971 and the second auxiliary line 972 are connected to the outside via terminals arranged in parallel in the first signal input/output area 950 and the second signal input/output area 960, and a ground potential is applied from the outside to the first auxiliary line 971 and the second auxiliary line 972. In this configuration, the first auxiliary line 971 and the second auxiliary line 972 are formed together with the first lines 911 to 917 and the second lines 921 to 926 and 929 by the metal lines 9a shown in FIG. 3C. Therefore, since the first auxiliary line 971 and the second auxiliary line 972 are formed without providing additional steps, the productivity is improved.

When forming the first auxiliary line 971 and the second auxiliary line 972, the first auxiliary line 971 and the second auxiliary line 972 may be formed in the different layer from the first lines 911 to 919 ad the second lines 921 to 926 and 929. For example, as shown in FIG. 3C, it is also possible to cover the first lines 911 to 919 and the second lines 921 to 926 and 929 with the inter-layer insulation film 4b, form the first auxiliary line 971 and the second auxiliary line 972 on the upper side of the inter-layer insulation film 4b, and connect the first auxiliary line 971 and the second auxiliary line 972 to the terminals arranged in parallel in the first signal input/output area 950 and the second signal input/output area 960 in parallel via an area from which the inter-layer insulation film 4b is removed. In this case as well, the first auxiliary line 971 and the second auxiliary line 972 may simply be connected to the outside via the terminals and applied with a ground potential from the outside. In this configuration, the short-circuit does not occur even when the first auxiliary line 971 and the second auxiliary line 972 are formed so as to intersect the first lines 911 to 919 and the second lines 921 to 926 and 929. Therefore, a configuration in which the first auxiliary line 971 and the second auxiliary line 972 are connected to each other or a configuration in which the first auxiliary line 971 surrounds the entire circumference of the input area 10a on the outer peripheral side may be realized. With the configuration in which the first auxiliary line 971 and the second auxiliary line 972 are connected, the number of terminals for applying the ground potential to the first auxiliary line 971 and the second auxiliary line 972 may advantageously be reduced. With the configuration in which the first auxiliary line 971 surrounds the entire circumference of the input area 10a on the outer peripheral side, the noise entry into the input area 10a from the outside is reliably prevented.

In this embodiment, in the first lines 911 to 919 formed in the first distribution area 955, the distance between the adjacent lines is wider for the lines having a long distribution length than for the lines having a short distribution length at least partly in the longitudinal direction. In this embodiment, since the distribution length is reduced from the first line 911 which is located on the outer side toward the line which is located inner side in sequence, the distance between the lines being adjacent on the outer side is wider than the distance between the lines being adjacent on the inner side at least partly in the longitudinal direction. In the first lines 911 to 919 formed in the first distribution area 955, the width of the lines having a long distribution length is wider than the width of the lines having a short distribution length. In this embodiment, since the distribution length is reduced from the first line 911 which is located on the outer side toward the lines which are located on the inner side in sequence, the width of the lines being located on the outer side is wider than the width of the lines being located on the inner side at least partly in the longitudinal direction.

In the second lines 921 to 926 formed in the long distance second distribution area 962, the distance between the adjacent lines is wider for the lines having a long distribution length than for the lines having a short distribution length at least partly in the longitudinal direction. In this embodiment, since the distribution length is increased from the second line 921 which is located on the inner side toward the lines which are located on the outer side in sequence, the distance between the lines being adjacent on the outer side is wider than the distance between the lines being adjacent on the inner side at least partly in the longitudinal direction. In the second lines 921 to 926 formed in the long distance second distribution area 962, the width of the lines having a long distribution length is wider than the width of the lines having a short distribution length at least partly in the longitudinal direction. In this embodiment, since the distribution length is increased from the second line 921 which is located on the inner side toward the lines located on the outer side in sequence, the width of the lines being located on the outer side is wider than the width of the lines being located on the inner side at least partly in the longitudinal direction.

EXAMPLES OF CONFIGURATION OF FIRST LINES 911 TO 919

Referring now to FIG. 4 and FIG. 5, advantages of the examples in which the first lines 911 to 919 are configured on the basis of the rules described above will be described.

FIG. 4 is an explanatory drawing showing an example of configuration of the first lines 911 to 919 or the like formed in the input device 10 to which the invention is applied. In FIG. 4, in Column 1, Column 2, Column 3, Column 4, Column 5, Column 6, and Column 7 from the left to the right, reference numerals of the first lines shown in FIG. 2, the portions shown in FIG. 2, the lengths of the respective portions, the widths of the respective portions, the distance from the first line located on the inner side, the parasitic capacitance, and the distribution resistance are shown. In Column 6, the values in parentheses are values of the capacitance being parasitic with respect to the line located on the inner side. The lengths and the widths of the first lines 911 to 919 are shown for the respective portions 955a to 955d shown in FIG. 2.

FIG. 5 is an explanatory drawing showing a configuration of the first lines 911 to 919 formed in the input device 10 according to a reference example in the invention, which corresponds to an example in which the distances between all the first lines 911 to 919 are equalized without forming the first auxiliary line 971 and the second auxiliary line 972 in the configuration shown in FIG. 2. Columns 1 to 7 in FIG. 5 correspond to Columns 1 to 7 in FIG. 4.

The parasitic capacitances shown in FIG. 4 and FIG. 5 are values calculated on the basis of the dielectric constant of an insulation layer which covers the periphery of the lines, the width of the line, the distance between the lines, and the opposed length between the lines.

As is understood from FIG. 4, in the first lines 911 to 919, the first lines 911 and 919 located at the both ends are formed with the first auxiliary line 971 and the second auxiliary line 972, and the distance between the first line 911 and the first line 912 is 55 μm at the portions 955b and 955c, while the distance between the first line 912 and the first line 913 is 45 μm at the portion 955b and 955c. In this manner, the distance between the adjacent lines is wider for the lines having a long distribution length than for the lines having a short distribution length at least partly in the longitudinal direction. Therefore, the capacitance value which is parasitic on the first line 911 is 4.88 pF which is the sum of the capacitances of the first auxiliary line 971 and the first line 912, and is equivalent to the capacitance values (4.83 to 5.04 pF) which are parasitic on other first lines 912 to 918. The capacitance value which is parasitic on the first line 919 is 4.82 pF which is the sum of the capacitances of the second auxiliary line 972 and the first line 918, and is equivalent to the capacitance values (4.83 to 5.04 pF) which are parasitic on other first lines 912 to 918.

Furthermore, in the first lines 911 to 919, the dimension of a narrowest portion of the longest first line 911 is 65 μm, while the dimension of a narrowest portion of the first line 912 is 60 μm. In this manner, the width of the lines having a long distribution length is wider than the width of the lines having a short distribution length at least partly in the longitudinal direction. Therefore, the distribution resistance of the first line 911 is 375Ω, and is substantially equivalent to the electric resistance (389 to 531Ω) of other first liens 912 to 919. The sheet resistance of the metal line is 0.2Ω/□.

In contrast, as is understood from FIG. 5, when the rules in the invention are not applied, for example, when the distribution distance is equalized among all the first lines 911 to 919, the capacitance values which are parasitic on the first lines 911 to 919 are significantly varied from 4.01 to 12.87 pF. However, the distribution resistances of the first lines 911 to 919 are substantially equivalent from 233 to 307Ω, since the widths of the lines are adjusted in this reference example.

The configuration described in conjunction with FIG. 4 and FIG. 5 is illustrative only, and various modifications may be made without departing from the scope of the invention.
EXAMPLES OF CONFIGURATION OF SECOND LINES 921 TO 926

Referring now to FIG. 6 and FIG. 7, advantages of the example in which the second lines 921 to 926 are configured on the basis of the rules according to the invention will be described.

FIG. 6 is an explanatory drawing showing an example of configuration of the second lines 921 to 926 or the like formed in the input device 10 to which the invention is applied. In FIG. 6, in Column 1, Column 2, Column 3, Column 4, Column 5, Column 6, and Column 7 from the left to the right, reference numerals of the first lines shown in FIG. 2, the portions shown in FIG. 2, the lengths of the respective portions, the widths of the respective portion, the distance from the first line located on the inner side, the parasitic capacitance, and the distribution resistance are shown. In Column 6 where the parasitic capacitance is shown, the values in parentheses are values of the capacitance which is parasitic with respect to the line located on the outer side. A value attached with an asterisk is a value of the capacitance which is parasitic between the second line 921 and the first translucent electrode patterns 11. The lengths and the widths of the second lines 921 to 926 are shown for the respective portions 962a to 962e shown in FIG. 2.

FIG. 7 is an explanatory drawing showing a configuration of the second lines 921 to 926 formed in the input device 10 according to a reference example in the invention, which corresponds to an example in which the distances of all the second lines 921 to 926 are equalized without forming the first auxiliary line 971 and the second auxiliary line 972 in the configuration shown in FIG. 2. Columns 1 to 7 in FIG. 7 correspond to Columns 1 to 7 in FIG. 6.

The parasitic capacitances shown in FIG. 6 and FIG. 7 are values calculated on the basis of the dielectric constant of an insulation layer which covers the periphery of the lines, the width of the line, the distance between the lines, and the opposed length between the lines.

As is understood from FIG. 6, in the second lines 921 to 926, the second line 926 located at the outermost position is formed with the first auxiliary line 971 and the distance between the second line 926 and the second line 925 is 56 μm at the portions 962b, 962c, and 962d, while the distance between the second line 923 and the second line 922 is 45 μm at the portions 962b, 962c, and 962d. In this manner, the distance between the adjacent lines is wider for the lines having a long distribution length than for the lines having a short distribution length at least partly in the longitudinal direction. Therefore, the capacitance which is parasitic on the second line 926 is 6.22 pF which is the sum of the capacitances of the first auxiliary line 971 and the second line 925, and is equivalent to the capacitance values (6.14 to 6.31 pF) which are parasitic on other second lines 922 to 925. The capacitance value which is parasitic on the second line 921 is 4.68 pF, and when a numeric value of 1.61 pF attached with an asterisk (the value of the capacitance which is parasitic between the second line 921 and the first translucent electrode patterns 11) is considered, it becomes 6.29 pF, which is equivalent to the capacitance values (6.14 to 6.31 pF) which are parasitic on other second lines 922 to 925.

Furthermore, in the second lines 921 to 926, the dimension of a narrowest portion of the longest second line 926 is 70 μm, while the dimension of a narrowest portion of the second line 922 is 65 μm. In this manner, the width of the lines having a long distribution length is wider than the width of the lines having a short distribution length at least partly in the longitudinal direction. Therefore, the distribution resistance of the second line 926 is 511Ω, and is the substantially equivalent to the electric resistance (418 to 484Ω) of other second lines 921 to 925.

In contrast, as is understood from FIG. 7, when the rules in the invention are not applied, the capacitance values which are parasitic on the second lines 921 to 926 are significantly varied from 9.41 to 20.62 pF. However, the distribution resistances of the second lines 921 to 926 are substantially equivalent from 376 to 426Ω, since the widths of the lines are adjusted in this reference example.

The configuration described in conjunction with FIG. 6 and FIG. 7 is illustrative only, and various modifications may be made without departing from the scope of the invention.

Main Advantages of the Embodiment

As described above, in the case of the lines at the ends of the first distribution area 955 and the long distance second distribution area 962, the parasitic capacitance has a tendency to be reduced since the adjacent line is present only on one side. However, in this embodiment, since the first auxiliary line 971 and the second auxiliary line 972 are provided so as to extend along the ends of the first distribution area 955 and the long distance second distribution area 962, the equivalent capacitances as other lines are parasitic on the lines at the ends. Therefore, the capacitances which are parasitic on the respective lines are equivalent, the change in capacitance can be detected accurately, so that the sensitivity of detection is improved.

In addition, since the shield line which surrounds the input area 10a on the outer peripheral side is configured by the first auxiliary line 971, the influence of noise entering from the outside is prevented. Therefore the change in capacitance is detected accurately, so that the sensitivity of detection is improved.

Since the distance between the adjacent lines and the width of the line are adequately adjusted depending on the distribution length, the capacitances which are parasitic on the respective lines are equivalent. Therefore, the change in capacitance can be detected accurately, so that the sensitivity of detection is improved.

Other Embodiments

In the embodiment shown above, the liquid crystal device 50 is employed as the image forming apparatus. However, the organic electroluminescence apparatus or a plasma display apparatus may be used as the image forming apparatus.

In the embodiment shown above, only the first auxiliary line 971 is provided in the long distance second distribution area 962. However the second auxiliary line 972 may be provided also in the inner peripheral side of the long distance second distribution area 962 depending on the layout or the like.

Figure 8A:
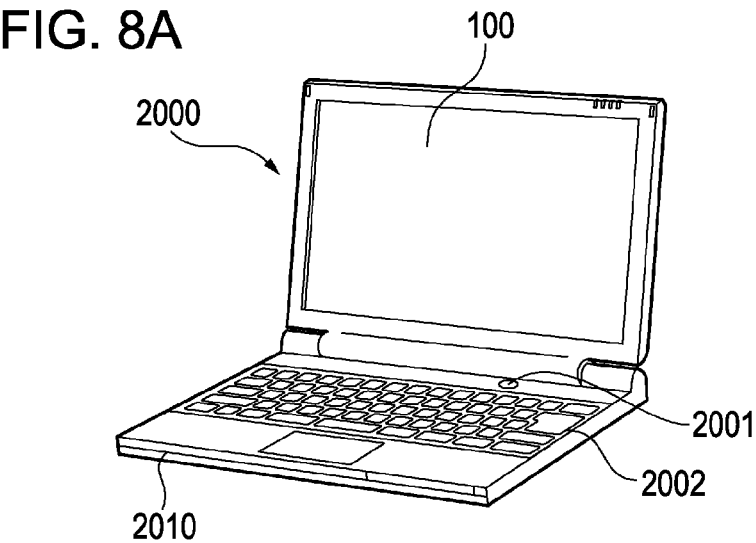
FIG. 8 is an explanatory drawing of an electronic apparatus in which a display apparatus with an input function according to the invention.
Figure 8B:
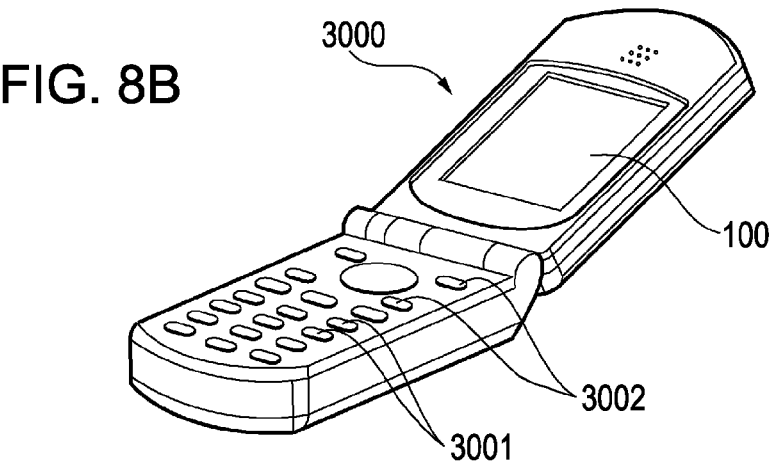
Figure 8C:
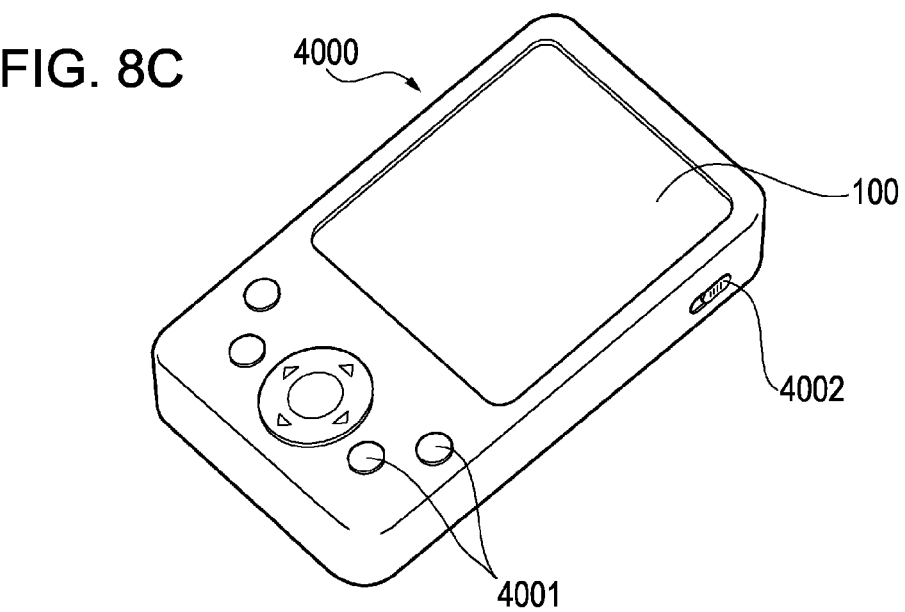

In the embodiment shown above, the example in which the input area 10a is divided has been described. However, even though the input area 10a is not divided, the present invention may be applied when the parasitic capacitance and the distribution resistance are varied among the lines.
EXAMPLE OF APPLICATION TO ELECTRONIC APPARATUS Subsequently, an electronic apparatus to which the display apparatus with an input function 100 according to the embodiment described above is applied will be described. A configuration of a mobile-type personal computer having the display apparatus with an input function 100 is shown in FIG. 8A. A personal computer 2000 includes the display apparatus with an input function 100 as a display unit and a body portion 2010. The body portion 2010 is provided with a power source switch 2001 and a keyboard 2002. A configuration of a mobile telephone set provided with the display apparatus with an input function 100 is shown in FIG. 8B. A mobile telephone set 3000 includes a plurality of operation buttons 3001 and a scroll button 3002, and the display apparatus with an input function 100 as the display unit. The screen displayed on the display apparatus with an input function 100 is scrolled by operating the scroll button 3002. A configuration of a data mobile terminal (PDA: Personal Digital Assistants) to which the display apparatus with an input function 100 is applied is shown in FIG. 8C. A data mobile terminal 4000 includes a plurality of operation buttons 4001 and a power source switch 4002, and the display apparatus with an input function 100 as the display unit. When the power source switch 4002 is operated, various data such as an address book or schedule are displayed on the display apparatus with an input function 100.

As the electronic apparatus to which the display apparatus with an input function 100 is applied includes terminal apparatuses such as digital still cameras, liquid crystal TV sets, car navigation systems, pagers, electronic databooks, word processors, work stations, TV telephones, POS terminals in addition to those shown in FIG. 8A to 8C.

What is claimed is:

1. An electrostatic capacitance input device having a plurality of first electrodes extending in a first direction and a plurality of second electrodes extending in a second direction intersecting the first direction in an input area, comprising:
    a plurality of first lines extending in parallel to each other from the plurality of first electrodes to a plurality of first terminals;
    a plurality of second lines extending in parallel to each other from the plurality of second electrode to a plurality of second terminals, the first lines and the second lines being formed outside the input area; and
    an auxiliary line extending outside at least one of the lines at both ends in terms of the direction of arrangement of one or both of the plurality of first lines and the plurality of second lines, the auxiliary line including a first auxiliary line and a second auxiliary line both generating a parasitic capacitance with respect to the at least one of the lines
    wherein the first auxiliary line and the second auxiliary line are arranged outside the lines at the both ends of one or both of the plurality of first lines and the plurality of second lines in terms of the direction of arrangement thereof, and
    wherein the first auxiliary line and the second auxiliary line generate the parasitic capacitances with respect to the lines at both ends respectively.

2. A display apparatus with an input function comprising the electrostatic capacitance device according to claim 1.

3. An electronic apparatus comprising the display apparatus according to claim 2.

4. An electrostatic capacitance input device having a plurality of first electrodes extending in a first direction and a plurality of second electrodes extending in a second direction intersecting the first direction in an input area, comprising:
    a plurality of first lines extending in parallel to each other from the plurality of first electrodes to a plurality of first terminals;
    a plurality of second lines extending in parallel to each other from the plurality of second electrode to a plurality of second terminals, the first lines and the second lines being formed outside the input area; and
    an auxiliary line extending outside at least one of the lines at both ends in terms of the direction of arrangement of one or both of the plurality of first lines and the plurality of second lines, the auxiliary line including a first auxiliary line and a second auxiliary line both generating a parasitic capacitance with respect to the at least one of the lines
    wherein the plurality of first line extend from one of the ends of the plurality of first electrodes in the input area to the plurality of first terminals so as to extend along an end side of the input area,
    wherein the first auxiliary line and the second auxiliary line arranged outside the lines at the both ends of the plurality of first lines in terms of the direction of arrangement thereof, and
    wherein the first auxiliary line and the second auxiliary line generate the parasitic capacitances with respect to the lines at the both ends respectively.

5. A display apparatus with an input function comprising the electrostatic capacitance device according to claim 4.

6. An electronic apparatus comprising the display apparatus according to claim 5.

7. An electrostatic capacitance input device having a plurality of first electrodes extending in a first direction and a plurality of second electrodes extending in a second direction intersecting the first direction in an input area, comprising:
    a plurality of first lines extending in parallel to each other from the plurality of first electrodes to a plurality of first terminals;
    a plurality of second lines extending in parallel to each other from the plurality of second electrode to a plurality of second terminals, the first lines and the second lines being formed outside the input area; and
    an auxiliary line extending outside at least one of the lines at both ends in terms of the direction of arrangement of one or both of the plurality of first lines and the plurality of second lines, the auxiliary line including a first auxiliary line and a second auxiliary line both generating a parasitic capacitance with respect to the at least one of the lines
    wherein the first auxiliary line constitutes a shield line which surrounds the input area on the outer peripheral side;
    wherein the first auxiliary line and the second auxiliary line are arranged outside the lines at the both ends of one or both of the plurality of first lines and the plurality of second lines in terms of the direction of arrangement thereof, and
    wherein the first auxiliary line and the second auxiliary line generate the parasitic capacitances with respect to the lines at both ends respectively.

8. A display apparatus with an input function comprising the electrostatic capacitance device according to claim 7.

9. An electronic apparatus comprising the display apparatus according to claim 8.

* * * * *